(12) United States Patent
Cuddihy et al.

(10) Patent No.: US 9,340,126 B2
(45) Date of Patent: *May 17, 2016

(54) AUTONOMOUS VEHICLE WITH RECONFIGURABLE SEATS

(71) Applicant: Ford Global Technologies, LLC, Dearborn, MI (US)

(72) Inventors: Mark A. Cuddihy, New Boston, MI (US); Manoharprasad K. Rao, Novi, MI (US); Jialiang Le, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,920

(22) Filed: May 20, 2015

(65) Prior Publication Data

US 2015/0251566 A1 Sep. 10, 2015

Related U.S. Application Data

(63) Continuation of application No. 14/085,135, filed on Nov. 20, 2013, now Pat. No. 9,096,150.

(51) Int. Cl.
*B60N 2/00* (2006.01)
*B60N 2/20* (2006.01)
*B60N 2/14* (2006.01)
*B60N 2/24* (2006.01)
(Continued)

(52) U.S. Cl.
CPC *B60N 2/203* (2013.01); *B60N 2/01* (2013.01); *B60N 2/0224* (2013.01); *B60N 2/0244* (2013.01); *B60N 2/0292* (2013.01); *B60N 2/06* (2013.01); *B60N 2/143* (2013.01); *B60N 2/24* (2013.01); *B60R 21/015* (2013.01); *B60R 21/231* (2013.01); *G05D 1/0088* (2013.01)

(58) Field of Classification Search
CPC ....................................................... B60N 2/143
See application file for complete search history.

(56) References Cited

U.S. PATENT DOCUMENTS 4,653,809 A 3/1987 Czernakowski
4,655,503 A 4/1987 Kamijo
(Continued)

FOREIGN PATENT DOCUMENTS

FR 2943961 10/2008
JP 2005225296 8/2005
WO WO 2011/154681 12/2011

OTHER PUBLICATIONS

Delphi Gives Drivers Peace of Mind With Advanced Vehicle Safety System Technology, Brighton, MI, Jun. 13, 2013, 3 pages, www.prnewswire.com/news-releases/delphi-gives-drivers-peace-of-mind-with-advanced-vehicle-safety-system-technology-73546777.html.

(Continued)

*Primary Examiner* — Jonathan M Dager
(74) *Attorney, Agent, or Firm* — Frank A. MacKenzie; Bejin Bieneman PLC

(57) ABSTRACT

A vehicle includes a passenger compartment and at least one seat located in the passenger compartment. The seat can be moved from a front-facing position to a rear-facing position for when the vehicle is operating in an autonomous mode. The vehicle may further include autonomous driving sensors and an autonomous controller that receives signals generated by the autonomous driving sensors and controls at least one vehicle subsystems according to the signals received.

14 Claims, 5 Drawing Sheets

(51) Int. Cl.
*B60N 2/01* (2006.01)
*B60N 2/02* (2006.01)
*B60N 2/06* (2006.01)
*B60R 21/015* (2006.01)
*B60R 21/231* (2011.01)
*G05D 1/00* (2006.01)

(56) References Cited

U.S. PATENT DOCUMENTS

| | | | |
|---|---|---|---|
| 5,195,795 A | 3/1993 | Cannera | |
| 5,292,179 A | 3/1994 | Forget | |
| 5,524,962 A | 6/1996 | Fulgenzi | |
| 6,024,647 A * | 2/2000 | Bennett | A63G 31/16 472/43 |
| 6,027,170 A | 2/2000 | Benz et al. | |
| 6,123,380 A | 9/2000 | Sturt | |
| 6,135,529 A | 10/2000 | De Angelis et al. | |
| 6,199,945 B1 | 3/2001 | Kim | |
| 6,240,352 B1 * | 5/2001 | McCurdy | B60N 2/002 280/735 |
| 6,457,694 B1 * | 10/2002 | Haynes | B60N 2/143 248/349.1 |
| 6,488,333 B2 * | 12/2002 | Kim | B60N 2/0284 296/64 |
| 6,494,531 B1 * | 12/2002 | Kim | B60N 2/0284 296/64 |
| 6,644,730 B2 | 11/2003 | Sugiura | |
| 6,773,026 B2 | 8/2004 | Meyer | |
| 6,782,831 B2 * | 8/2004 | Yamada | B61B 1/00 104/53 |
| 6,820,911 B2 | 11/2004 | Furui | |
| 6,955,386 B2 | 10/2005 | Rhodes | |
| 6,991,285 B1 * | 1/2006 | Hemenway | B60N 2/203 296/65.01 |
| RE39,101 E | 5/2006 | Miyahara | |
| 7,234,768 B2 | 6/2007 | Manning | |
| 7,237,837 B2 | 7/2007 | Queveau | |
| 7,281,761 B2 * | 10/2007 | Brown | B60N 2/06 297/188.05 |
| 7,644,982 B2 | 1/2010 | Paluch | |
| 7,775,599 B2 * | 8/2010 | George | B60N 2/22 297/101 |
| 8,534,735 B2 * | 9/2013 | McManus | B62D 31/00 296/26.08 |
| 2002/0024245 A1 | 2/2002 | Kim | |
| 2003/0047974 A1 * | 3/2003 | Tame | B60N 2/34 297/283.3 |
| 2004/0262940 A1 * | 12/2004 | Johnson | B60N 2/01 296/64 |
| 2005/0038575 A1 * | 2/2005 | Wu | B61L 27/04 701/19 |
| 2005/0253433 A1 | 11/2005 | Brown | |
| 2006/0042497 A1 * | 3/2006 | Yamada | B61B 13/12 104/18 |
| 2007/0198145 A1 * | 8/2007 | Norris | H04L 67/12 701/23 |
| 2009/0277372 A1 * | 11/2009 | Wood | B60N 2/203 114/363 |
| 2011/0071718 A1 | 3/2011 | Norris | |
| 2011/0233951 A1 * | 9/2011 | Zekavica | B60N 2/3013 296/24.34 |
| 2012/0313394 A1 | 12/2012 | Barrow | |
| 2013/0002416 A1 * | 1/2013 | Gazit | B62D 1/28 340/438 |
| 2013/0006478 A1 * | 1/2013 | Lin | B60N 2/10 701/49 |
| 2014/0088855 A1 | 3/2014 | Ferguson | |
| 2014/0138991 A1 * | 5/2014 | Deimen | B60N 2/203 297/101 |
| 2014/0207535 A1 * | 7/2014 | Stefan | G05D 1/0022 705/7.42 |
| 2014/0207537 A1 | 7/2014 | Joyce | |
| 2014/0260761 A1 * | 9/2014 | Soderlind | B62D 1/181 74/493 |
| 2014/0277896 A1 * | 9/2014 | Lathrop | B62D 1/04 701/23 |
| 2015/0142246 A1 * | 5/2015 | Cuddihy | B62D 1/183 701/23 |
| 2015/0142247 A1 * | 5/2015 | Rao | B60R 21/20 701/23 |

OTHER PUBLICATIONS

Rapidly Reconfigurable Interior Capability, 2011 Northrop Grumman Corporation, 2 pages.
William Diem, "Camera Technology Monitors Where Driver is Looking," WardsAuto, Aug. 5, 2013; 203 CAR Management Briefing Seminars, 3 pages.
Gary Gu, "An Automotive and Transportation Designer," Feb. 12, 2013, 13 pages.
J. Arellano, "2008 Chrysler Town & Country: Minivan Luxury Just Went Up", Jan. 12, 2007, Automotive.com, 8 pages, http://blogs.automotive.com/2008-chrysler-town-country-minivan-luxury-just-went-up-873.html[Sep. 4, 2013 12:05:43 PM].

* cited by examiner

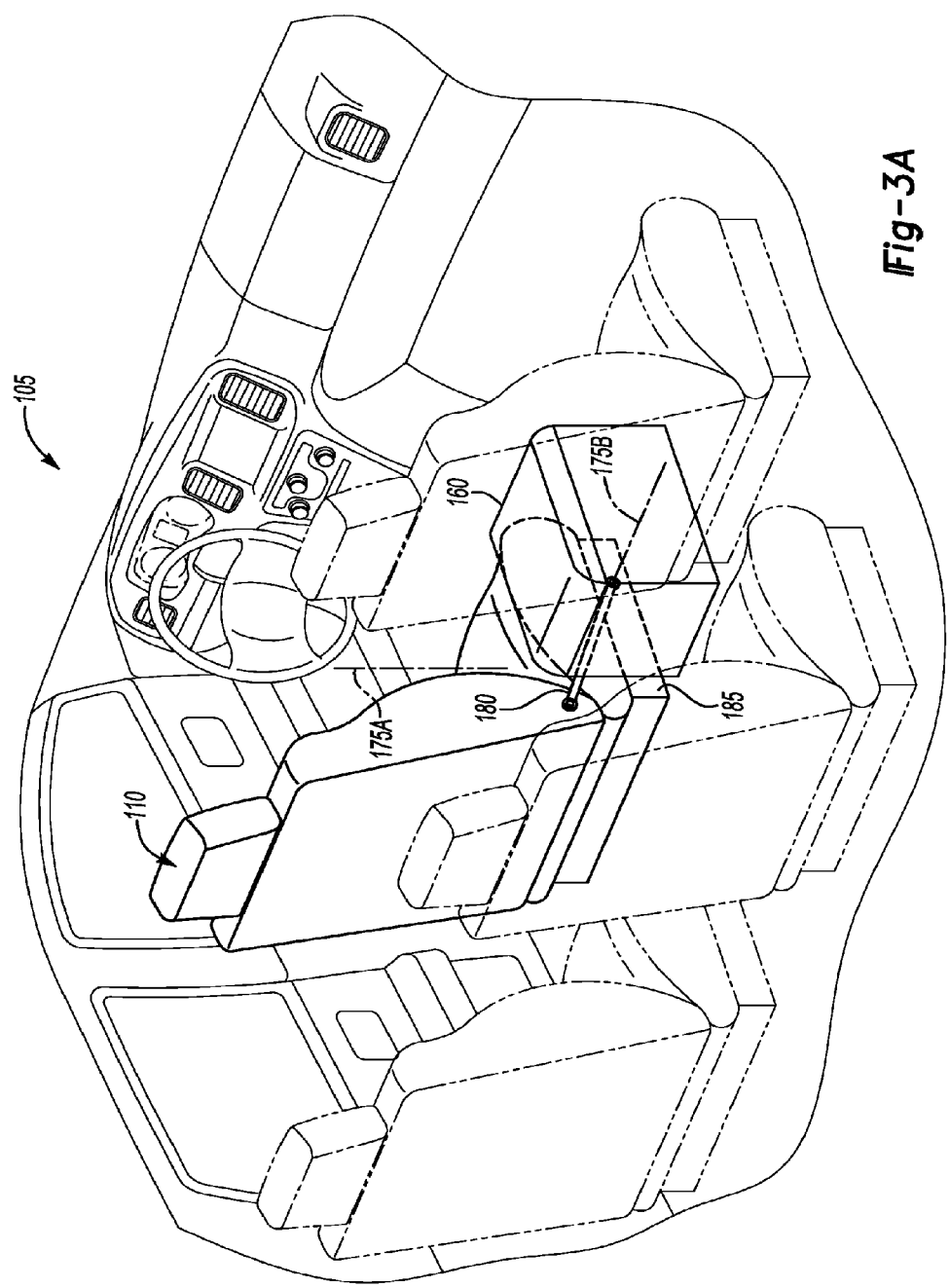

AUTONOMOUS VEHICLE WITH RECONFIGURABLE SEATS

CROSS-REFERENCE TO RELATED APPLICATIONS

This application is a continuation of U.S. Ser. No. 14/085,135 filed on Nov. 20, 2013 and titled "AUTONOMOUS VEHICLE WITH RECONFIGURABLE SEATS", the contents of which are hereby incorporated by reference in their entirety. This application is related to U.S. Ser. No. 14/085,158 filed on Nov. 20, 2013 and U.S. Ser. No. 14/085,166 filed on Nov. 20, 2013, both titled "AUTONOMOUS VEHICLE WITH RECONFIGURABLE SEATS", the contents of which are hereby incorporated by reference in their entirety.

BACKGROUND

Autonomous vehicles are becoming more sophisticated. As the level of sophistication increases, the amount of passenger interaction required by the autonomous vehicle decreases. Eventually, autonomous vehicles will require no passenger interaction beyond, e.g., selecting a destination, leaving passengers to focus on non-driving-related tasks.

BRIEF DESCRIPTION OF THE DRAWINGS

FIGS. 3A-3B illustrate one exemplary passenger compartment of an autonomous vehicle with reconfigurable seats.

DETAILED DESCRIPTION

An exemplary autonomous vehicle includes a passenger compartment and at least one seat located in the passenger compartment. The seat can be moved from a front-facing position to a rear-facing position when the vehicle is stationary or while the vehicle is operating in an autonomous mode. In some implementations, the seat may include a bench seat with a bottom portion and a back portion. The bench seat may be configured to move from a front-facing position to a rear-facing position by moving the back portion toward a front of the passenger compartment. Moreover, the seat may be stowed under the instrument panel in certain implementations. The vehicle may further include autonomous driving sensors and an autonomous controller that receives signals generated by the autonomous driving sensors (e.g., sensors for driving the vehicle in an autonomous mode) and controls at least one vehicle subsystem to operate the vehicle in autonomous mode according to the signals received.

The FIGS. illustrate exemplary views of an autonomous vehicle 100 with reconfigurable seats. The vehicle may take many different forms and include multiple and/or alternate components and facilities. While an exemplary vehicle is shown, the exemplary components illustrated are not intended to be limiting. Indeed, additional or alternative components and/or implementations may be used. Moreover, the components shown in the FIGS. are not necessarily drawn to scale.

Figure 1:
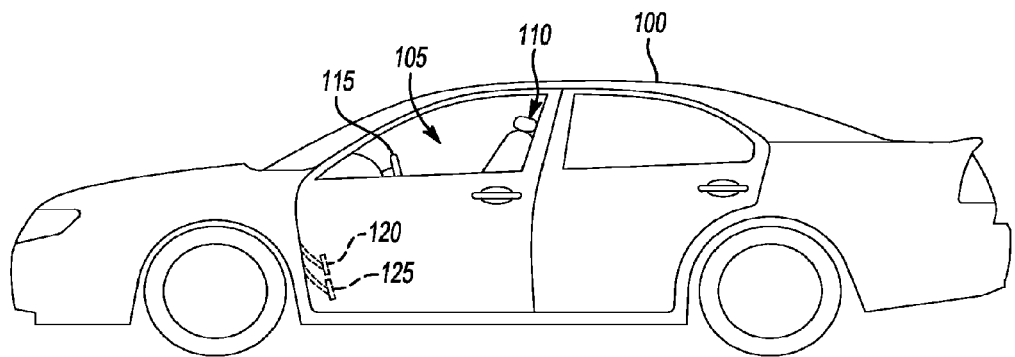
FIG. 1 illustrates an exemplary autonomous vehicle with reconfigurable seats.

As illustrated in FIG. 1, the vehicle 100 includes a passenger compartment 105 located in an interior of the vehicle 100. The passenger compartment 105 may include any part of the vehicle 100 where passengers may sit while the vehicle 100 is operating. In addition, the passenger compartment 105 may include seats 110 and controls that allow a driver to control operation of the vehicle 100. Examples of controls may include a steering wheel 115, an accelerator pedal 120, a brake pedal 125, etc. Although illustrated as a sedan, the vehicle 100 may include any passenger or commercial vehicle such as a car, a truck, a sport utility vehicle, a taxi, a bus, etc.

Figure 2:
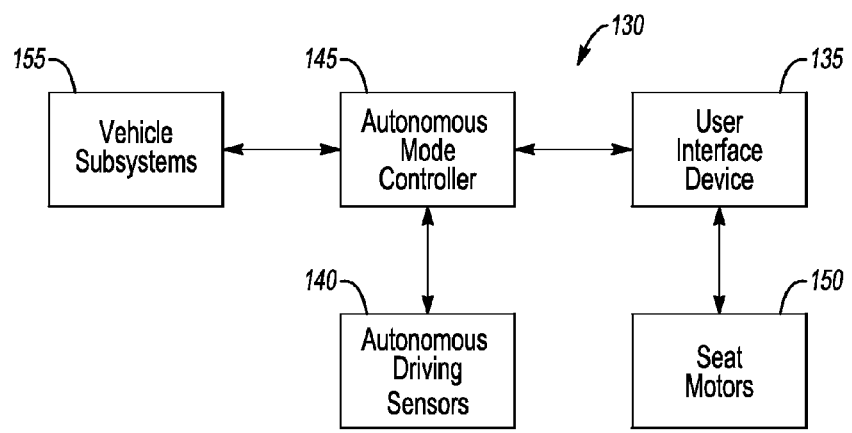
FIG. 2 is a block diagram of an exemplary system that may be used in the autonomous vehicle of FIG. 1.

FIG. 2 is a block diagram of an exemplary system 130 that may be used in the autonomous vehicle 100. As shown, the system 130 includes a user interface device 135, autonomous driving sensors 140, an autonomous mode controller 145, and a seat motor 150.

The user interface device 135 may be configured to present information to a user, such as a driver, during operation of the vehicle 100. Moreover, the user interface device 135 may be configured to receive user inputs. Thus, the user interface device 135 may be located in the passenger compartment 105 of the vehicle 100. In some possible approaches, the user interface device 135 may include a touch-sensitive display screen.

The autonomous driving sensors 140 may include any number of devices configured to generate signals that help navigate the vehicle 100 while the vehicle 100 is operating in an autonomous (e.g., driverless) mode. Examples of autonomous driving sensors 140 may include a radar sensor, a lidar sensor, a camera, or the like. The autonomous driving sensors 140 help the vehicle 100 "see" the roadway and the vehicle surroundings and/or negotiate various obstacles while the vehicle 100 is operating in the autonomous mode.

The autonomous mode controller 145 may be configured to control one or more subsystems 155 while the vehicle 100 is operating in the autonomous mode. Examples of subsystems 155 that may be controlled by the autonomous mode controller 145 may include a brake subsystem, a suspension subsystem, a steering subsystem, and a powertrain subsystem. The autonomous mode controller 145 may control any one or more of these subsystems 155 by outputting signals to control units associated with these subsystems 155. The autonomous mode controller 145 may control the subsystems 155 based, at least in part, on signals generated by the autonomous driving sensors 140.

The seat motors 150 may be configured to control the position and/or orientation of one or more seats 110 inside the passenger compartment 105. Each motor 150 may be associated with only one seat 110. Alternatively, a single motor 150 may be used to move multiple seats 110, including an entire row of seats 110. The motor 150 may operate in accordance with control signals output by the user interface device 135. For example, the user interface device 135 may receive commands from the driver or another passenger indicating a desire for one or more seats 110 to adopt a particular configuration. The motor 150 may automatically adjust the seats 110 to the desired configuration. Examples of different possible seat 110 configurations are described in greater detail below. For example, the motor 150 may cause the seat 110 to pivot, fold, unfold, slide, recline, etc.

Figure 3B:
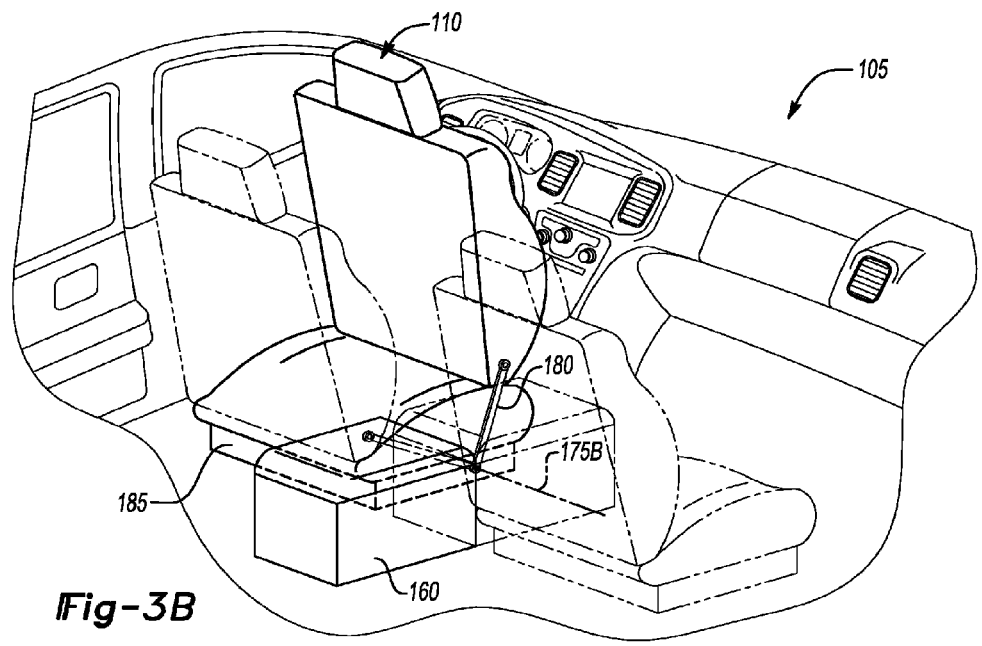

Referring now to FIGS. 3A-3B, the passenger compartment 105 includes a number of seats 110 and a center console 160. The seats 110 may include one or more bucket seats, captain's chairs, bench seats, split bench seats, or the like. Moreover, the seats 110 may be separated into rows, including a first row, a second row, and in some instances, a third row (see, e.g., FIG. 8). The first row may generally refer to the row closest to the front of the vehicle 100. One or more seats 110, such as the seats 110 in the first row, may be moved from a front-facing position to a rear-facing position while the vehicle is stationary or while the vehicle is moving to allow the passengers in the vehicle 100 to face one another when the vehicle 100 is operating in the autonomous mode.

One way to move the seats 110 from the front-facing position to the rear-facing position may be to rotate the seat 110. The seat 110 may be rotated about an axis 175A that extends generally perpendicularly from a floor of the vehicle 100 and through a center of the seat 110. Rotating the seat 110 may occur automatically when the vehicle 100 is operating in the autonomous mode or while the vehicle is parked. Moreover, the seat 110 may be rotated manually by, e.g., removing and repositioning the seat 110 or spinning the seat 110 about the axis 175A.

Alternatively, one part of the seat 110, such as a back portion 165, may pivot relative to another part of the seat 110, such as a bottom portion 170. FIGS. 3A-3B show how the back portion 165 may pivot relative to an axis 175B defined by the bottom portion 170. That is, the back portion 165 of the seat 110 may include one or more arms 180 that are pivotally attached to a frame 185 of the bottom portion 170. When the back portion 165 has been pivoted to a rear-facing position, the bottom portion 170 may become angled toward the front of the vehicle 100 as shown. The movement of the seat 110 from the front-facing position to the rear-facing position, and vice versa, may be actuated manually or by the motor 150 (not shown in FIGS. 3A-3B) when the vehicle 100 is stationary or operating in the autonomous mode. Different ways of reorienting the seats are described for illustrative purposes only. Other suitable ways to reorient the seats while the vehicle is stationary or moving in autonomous mode may alternatively be used.

A locking mechanism (not shown) may prevent the seat 110 from being moved to the rear-facing position, and vice versa. The locking mechanism may be manually unlocked by the user or automatically by, e.g., the motor 150 or another device. The original position of the seat 110 is shown in FIG. 3A, and FIG. 3B shows one of the seats 110 in a rearward position.

The console 160 located between the two front seats 110 may be configured to slide toward the front of the vehicle 100 when one or both seats 110 in the front row are in the rear-facing position. Alternatively, the console 160 may slide toward the back of the vehicle 100 to a position between the first and second rows of seats 110. This way, when one or more seats 110 in the first row are oriented in a rear-facing position, the center console 160 may act as a table available for passengers in either the first row and/or second row to use. The rearward movement of the central console 160 may also facilitate the reorientation of seats 110, which move between forward and rearward orientations by rotational movements. In other words, the entire console 160 may move toward a center of the passenger compartment 105 to allow one or more of the seats 110 to change orientations. FIG. 3A shows the console 160 in its original position while FIG. 3B shows the console 160 moved away from the front of the vehicle 100.

Figure 4:
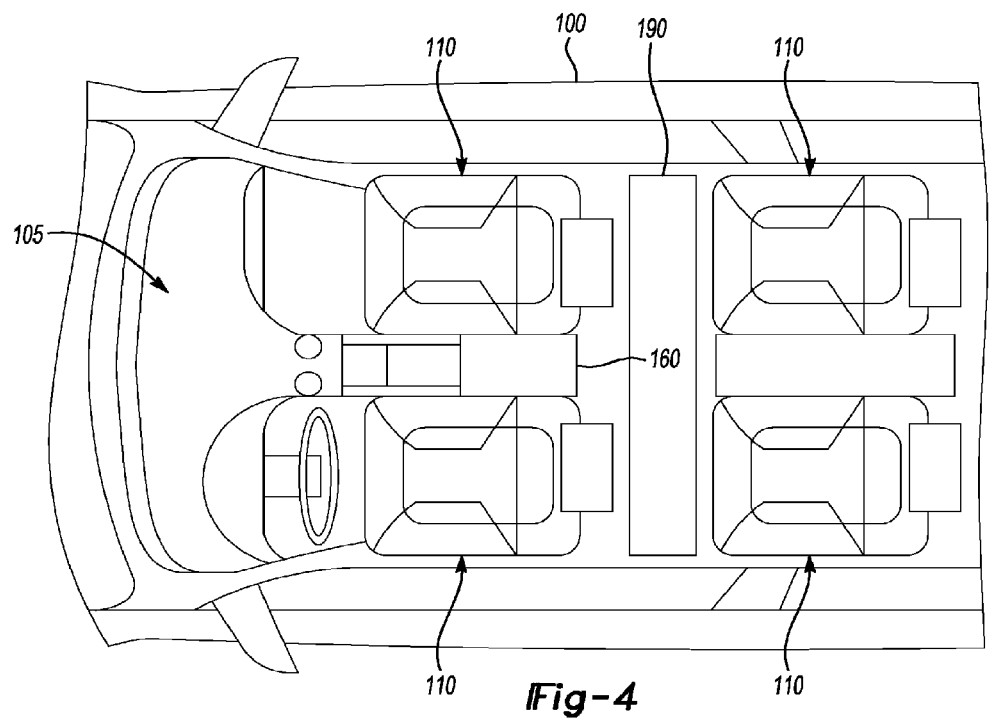
FIG. 4 illustrates an exemplary passenger compartment having an airbag located between rows of seats.

Referring now to FIG. 4, an airbag 190 may be located in the passenger compartment 105 between the first and second rows of seats 110. The airbag 190 may be deployed as a result of a collision while the vehicle 100 is operating in the autonomous mode and/or in a non-autonomous mode. The airbag 190 may be shaped such that a single airbag may be used for all passengers, including rear-facing passengers sitting in the first row and front-facing passengers sitting in the second row or multiple airbags may be used. Although the seats 110 shown in FIG. 4 are separate, the seats 110 may include bench seats or split bench seats that form an entire row, as shown in FIGS. 5 and 6.

Figure 5:
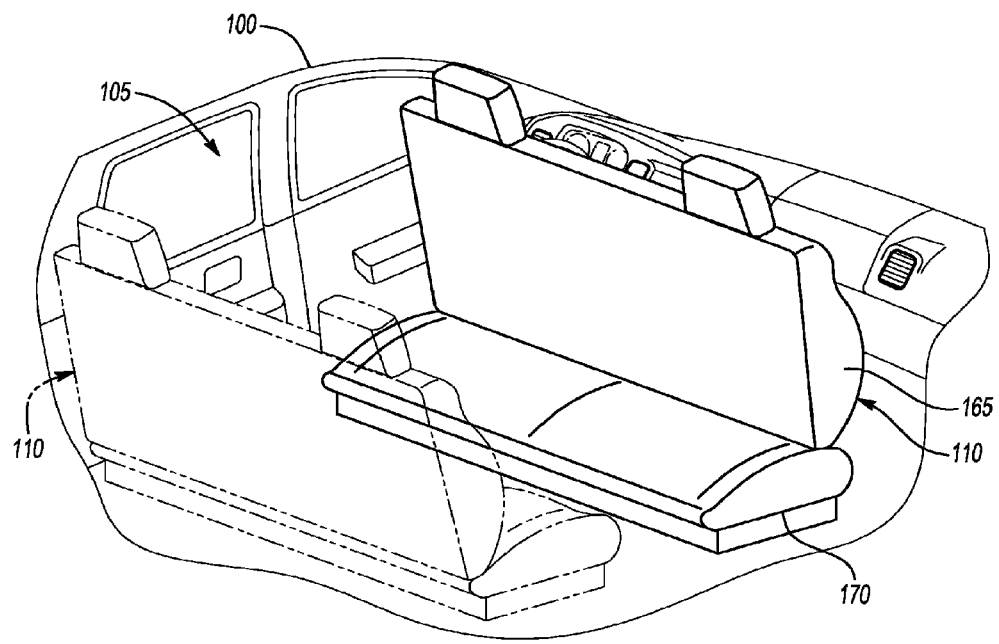
FIG. 5 illustrates a second exemplary passenger compartment of an autonomous vehicle with reconfigurable seats.
Figure 6:
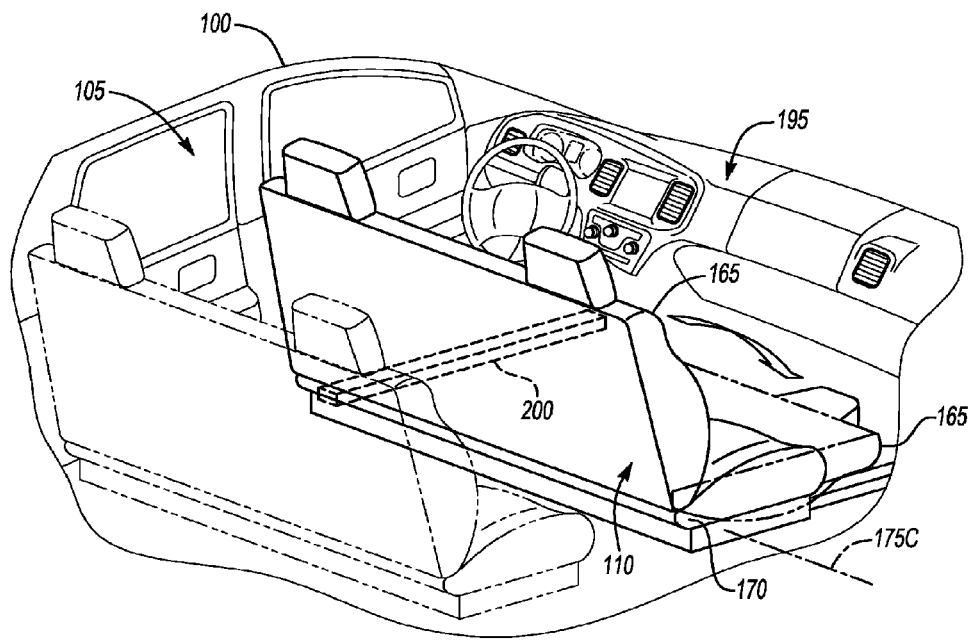
FIG. 6 illustrates a third exemplary passenger compartment of an autonomous vehicle with reconfigurable seats.

FIGS. 5 and 6 illustrate a passenger compartment 105 with two rows of bench seats 110. In FIG. 5, the first row is arranged in a rear-facing position and the second row is arranged in a front-facing position. Although not shown in FIG. 5, the front bench seat 110 may include arms 180 and a frame 185 similar to those shown in FIG. 3 for moving the front bench seat 110 into the rear-facing position. Therefore, the back portion 165 of the bench seat 110 may be configured to pivot about the axis 175B (see FIG. 3) defined by the bottom portion 170 to move into the rear-facing position. Pivoting the back portion 165 about the axis 175B and toward the front of the passenger compartment 105 may cause the bench seat 110 to be arranged in the rear-facing position while pivoting the back portion 165 about the axis 175B and away from the front of the passenger compartment 105 may cause the bench seat 110 to be arranged in the front-facing position (shown in solid line in FIG. 6). Moreover, the steering wheel 115 may move toward the instrument panel 195 to make room for the front seats 110 to move toward the instrument panel 195 to increase the leg room between the front and second row seats 110 when the front seats 110 are facing rearward.

Figure 7:
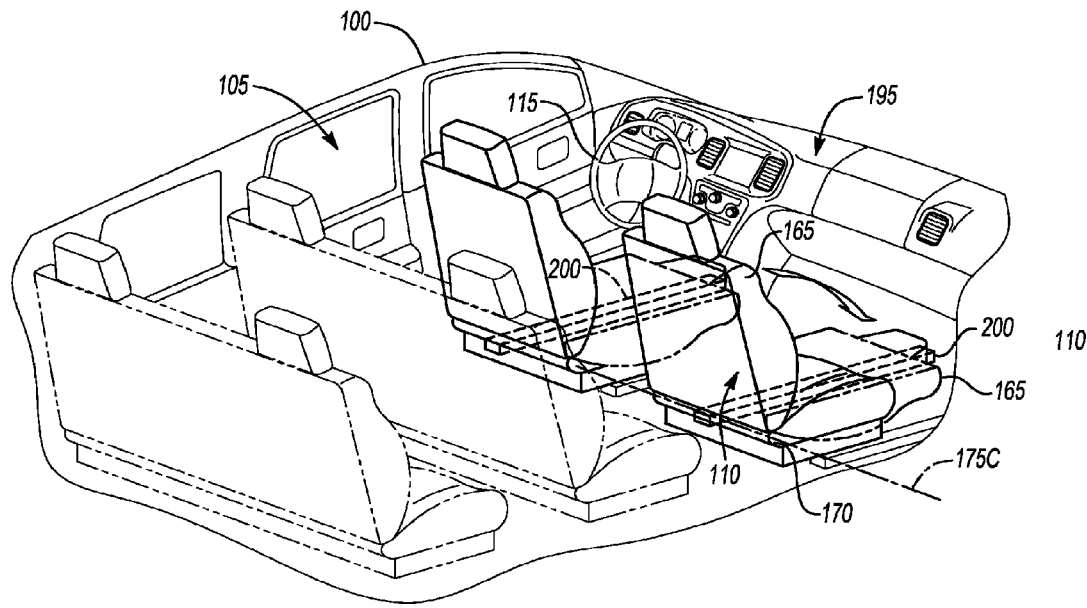
FIG. 7 illustrates a fourth exemplary passenger compartment of an autonomous vehicle with reconfigurable seats.
Figure 8:
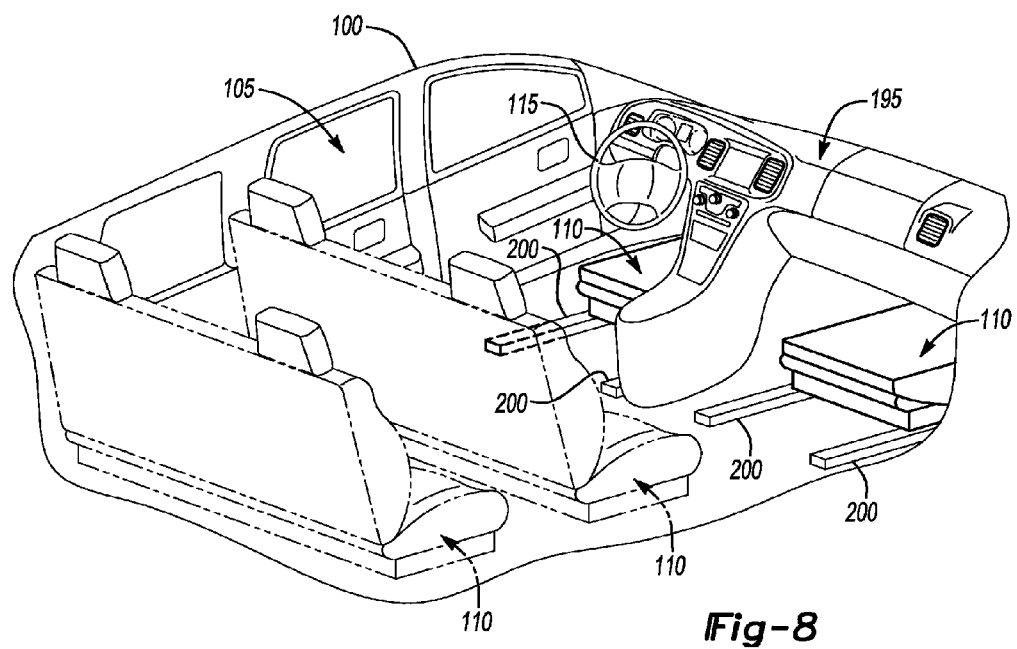
FIG. 8 illustrates a fifth exemplary passenger compartment of an autonomous vehicle with reconfigurable seats.

Alternatively, with reference to FIGS. 6-8, the front row seats 110 may be folded toward the front of the passenger compartment 105 about another axis 175C defined by the bottom portion 170 of each seat 110. The seats 110 may be folded and, e.g., stowed under the instrument panel 195, which may be located at the front of the passenger compartment 105. In one possible approach, the folded seats 110, including the driver seat and the front passenger seat, may slide along rails 200, located on the floor in the passenger compartment 105, toward an area underneath the instrument panel 195. FIG. 6 illustrates an example where the front row includes a bench seat 110 and FIGS. 7 and 8 illustrate examples where the front row includes adjacent bucket seats 110 (i.e., a driver seat and a front passenger seat). The motor 150 (see FIG. 2) may be used to fold the seats 110 and/or move the seats 110 to the location under the instrument panel 195. Moreover, the motor 150 may return one or more of the seats 110 to their original positions and/or orientations.

To accommodate the seats 110 under the instrument panel 195, one or more components located in the passenger compartment 105, such as the accelerator pedal 120 and the brake pedal 125 (see FIG. 1), may be moved further toward the front of the passenger compartment 105. Moreover, the steering wheel 115 may move to make room for the driver's seat 110 to slide under the instrument panel 195. In some possible approaches, another row of seats 110, such as the second row or third row (see FIG. 8), may move forward when the seats 110 in the first row are stowed under the instrument panel 195. Alternatively, or in addition, the third row may, e.g., recline so that the back portion 165 and bottom portion 170 are substantially aligned with one another.

In general, computing systems and/or devices, such as the autonomous mode controller 145, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a plurality of seats, at least one of which is configured to be moved from a front facing position to a rear facing position for when a host vehicle is operating in an autonomous mode; and
   a console located between at least two seats, wherein the console is configured to slide toward a back of the host vehicle when at least one of the seats is moved from the front facing position to the rear facing position.

2. The vehicle system of claim 1, wherein at least one of the seats is configured to pivot from the front facing position to the rear facing position.

3. The vehicle system of claim 1, further comprising an airbag between a front row of seats and a back row of seats.

4. The vehicle system of claim 3, wherein the airbag is deployed only when at least one of the seats in the front row of seats is in the rear facing position.

5. The vehicle system of claim 1, wherein the seat includes at least one of a bucket seat, a captain's chair, a bench seat, and a split bench seat.

6. The vehicle system of claim 1, wherein the seat includes a back portion and a bottom portion, and wherein moving the seat to the rear facing position includes pivoting the back portion about an axis defined by the bottom portion such that the back portion moves toward a front of the passenger compartment.

7. A vehicle system comprising:

autonomous driving sensors;

an autonomous controller configured to receive signals generated by the autonomous driving sensors and control at least one vehicle subsystems according to the signals;

a plurality of seats configured to be moved from a front facing position to a rear facing position for when the vehicle is operating in an autonomous mode;

a console between at least two of the plurality of seats, wherein the console is configured to slide toward a back of the vehicle when at least one of the seats is moved from the front facing position to the rear facing position; and an airbag located in the passenger compartment between a front row of seats and a back row of seats and is deployed only when at least one of the seats in the front row of seats is in the rear facing position.

8. The vehicle system of claim 7, wherein at least one of the seats is configured to pivot from the front facing position to the rear facing position.

9. The vehicle system of claim 7, wherein at least one of the seats includes a back portion and a bottom portion, and wherein moving the at least one of the seats to the rear facing position includes pivoting the back portion about an axis defined by the bottom portion such that the back portion moves toward a front of the passenger compartment.

10. The vehicle system of claim 7, wherein the airbag is deployed only when at least one of the seats is in the rear facing position.

11. A vehicle system comprising:

autonomous driving sensors;

an autonomous controller configured to receive signals generated by the autonomous driving sensors and control at least one vehicle subsystems according to the signals;

a plurality of seats forming a front row and a back row, wherein at least one of the seats is configured to be moved from a front facing position to a rear facing position for when the vehicle is operating in an autonomous mode;

an airbag located between the front row and the back row and is deployed only when at least one of the seats in the front row of seats is in the rear facing position.

12. The vehicle system of claim 11, wherein at least one of the seats is configured to pivot from the front facing position to the rear facing position.

13. The vehicle system of claim 11, wherein the plurality of seats includes at least one of a bucket seat, a captain's chair, a bench seat, and a split bench seat.

14. The vehicle system of claim 11, wherein the seat includes a back portion and a bottom portion, and wherein moving the seat to the rear facing position includes pivoting the back portion about an axis defined by the bottom portion such that the back portion moves toward a front of the passenger compartment.

* * * * *